(12) United States Patent
Salter

(10) Patent No.: US 10,737,649 B2
(45) Date of Patent: Aug. 11, 2020

(54) VEHICLE ANALYSIS METHOD AND SYSTEM

(71) Applicant: JAGUAR LAND ROVER LIMITED, Coventry, Warwickshire (GB)

(72) Inventor: Spencer Salter, Warwickshire (GB)

(73) Assignee: JAGUAR LAND ROVER LIMITED, Coventry, Warwickshi (GB)

( * ) Notice: Subject to any disclaimer, the term of this patent is extended or adjusted under 35 U.S.C. 154(b) by 0 days.

(21) Appl. No.: 16/085,902

(22) PCT Filed: Mar. 17, 2017

(86) PCT No.: PCT/EP2017/056374
§ 371 (c)(1),
(2) Date: Sep. 17, 2018

(87) PCT Pub. No.: WO2017/158155
PCT Pub. Date: Sep. 21, 2017

(65) Prior Publication Data
US 2019/0092258 A1 Mar. 28, 2019

(30) Foreign Application Priority Data
Mar. 18, 2016 (GB) .................................. 1604610.4

(51) Int. Cl.
*B60R 21/0132* (2006.01)
*G07C 5/00* (2006.01)
(Continued)

(52) U.S. Cl.
CPC ......... *B60R 21/0132* (2013.01); *B60W 40/10* (2013.01); *G07C 5/008* (2013.01);
(Continued)

(58) Field of Classification Search
CPC ........ B60R 21/0132; B60R 2021/0027; G07C 5/0808; G07C 5/085; G07C 5/008; B60W 40/10; B60W 40/08
See application file for complete search history.

(56) References Cited

U.S. PATENT DOCUMENTS 6,246,933 B1 6/2001 Bague
7,471,998 B2 12/2008 Peravali et al.
(Continued)

FOREIGN PATENT DOCUMENTS

GB 2268608 A 1/1994
WO 2014198671 A1 12/2014

OTHER PUBLICATIONS

International Search Report and Written Opinion, PCT/EP2017/056374, 16 pages, dated Jun. 27, 2017.
(Continued)

*Primary Examiner* — Anne Marie Antonucci
(74) *Attorney, Agent, or Firm* — Miller Nash Graham & Dunn LLP

(57) ABSTRACT

A computer implemented method of reconstructing vehicle behaviour for a vehicle that has been subject to a critical event, the method comprising: receiving vehicle sensor data associated with vehicle motion; receiving a critical event notification signal, the critical event notification signal being associated with a critical event time for the critical event; deriving, from the received vehicle sensor data, a vehicle trajectory within a time window prior and adjacent to the critical event time; analysing the vehicle trajectory to determine forces acting through the vehicle system; outputting a notification signal in the event that one or more of the determined forces exceeds one of more of the operating parameters of the vehicle.

20 Claims, 11 Drawing Sheets

(51) Int. Cl.
*G07C 5/08* (2006.01)
*B60W 40/10* (2012.01)
*B60W 40/08* (2012.01)
*B60R 21/00* (2006.01)

(52) U.S. Cl.
CPC .......... *G07C 5/085* (2013.01); *G07C 5/0808* (2013.01); *B60R 2021/0027* (2013.01); *B60W 40/08* (2013.01)

(56) References Cited

U.S. PATENT DOCUMENTS

| | | |
|---|---|---|
| 2002/0035422 A1 | 3/2002 | Sasaki |
| 2004/0122639 A1 | 6/2004 | Qiu |
| 2007/0143087 A1* | 6/2007 | Musale .................. G06F 30/23 703/8 |
| 2010/0030540 A1 | 2/2010 | Choi et al. |
| 2014/0195169 A1 | 7/2014 | Wanami |
| 2014/0358840 A1* | 12/2014 | Tadic .................. B60W 40/09 706/52 |
| 2015/0112543 A1 | 4/2015 | Binion et al. |
| 2015/0149218 A1 | 5/2015 | Bayley et al. |
| 2016/0144838 A1 | 5/2016 | Spencer et al. |

OTHER PUBLICATIONS

Search and Examination Report, GB1604610.4, 8 pages, dated Sep. 19, 2016.
Search and Examination Report, GB1704245.8, 8 pages, dated Sep. 14, 2017.

* cited by examiner

| Time | Vehicle Speed | Engine Speed | BrakeswitchStatus |
|---|---|---|---|
| -5s | 96.58 | 2148 | Normal Condition |
| -4.5s | 95.56 | 2126 | Normal Condition |
| -4s | 94.38 | 2105 | Normal Condition |
| -3.5s | 93.6 | 2082 | Normal Condition |
| -3s | 92.81 | 2064 | Brake Pedal Pressed |
| -2.5s | 90.56 | 2017 | Brake Pedal Pressed |
| -2s | 87.86 | 1951 | Brake Pedal Pressed |
| -1.5s | 84.31 | 1873 | Brake Pedal Pressed |
| -1s | 78.3 | 1737 | Brake Pedal Pressed |
| -0.5s | 69.01 | 1477 | Brake Pedal Pressed |
| 0s | 59.11 | 1612 | Brake Pedal Pressed |

112

| Time | Steering Wheel Angle | Stability Control Longitudinal Acceleration | Stability Control Lateral Acceleration | Stability Control Heave Acceleration | Stability Control Yaw Rate | Stability Control Roll Rate | Stability Control Pitch Rate |
|---|---|---|---|---|---|---|---|
| data | data | data | data | data | data | data | data |
| -1.2s | 8 | -4.9275 | -2.3875 | 0.42625 | -6.44 | 3 | 2.61 |
| -1.1s | 17.8 | -4.78125 | -0.82375 | 1.46125 | 1.885 | 0.72 | -2.775 |
| -1s | 18 | -5.2925 | 0.65375 | 1.65625 | 7.11 | 1.11 | 0.555 |
| -0.9s | 7 | -5.56125 | 1.3575 | 0.59625 | 7.22 | -0.165 | -1 |
| -0.8s | -23.2 | -5.4025 | -0.16875 | -0.9375 | 2.055 | 0.94 | -3.61 |
| -0.7s | -57.4 | -4.45125 | 1.515 | -1.29125 | -6.665 | -16.61 | 1 |
| -0.6s | -76.9 | -4.45125 | -4.59375 | -1.36375 | -16.885 | -10.555 | 4.61 |
| -0.5s | -92.3 | -4.04875 | -6.57 | -0.09625 | -24.775 | 3.22 | -2.33 |
| -0.4s | -110.6 | -4.13375 | -8.27875 | 0.4375 | -24.83 | 6.275 | -3.055 |
| -0.3s | -120.3 | -2.78 | -7.1875 | -0.085 | -23.5 | 9.775 | -3.72 |
| -0.2s | -130.3 | -3.9025 | -6.7875 | 1.595 | -26.44 | -5.055 | -0.11 |
| -0.1s | -143.8 | -3.6825 | -2.8 | -0.925 | -27.11 | 1 | 1.665 |
| 0s | -144.4 | -6.7075 | -4.3025 | -5.5175 | -13.44 | -3.22 | 6.055 |

VEHICLE ANALYSIS METHOD AND SYSTEM

CROSS-REFERENCE TO RELATED APPLICATIONS

This application is a 371 of International Application No. PCT/EP2017/056374, filed Mar. 17, 2017, which claims priority to GB Patent Application 1604610.4, filed Mar. 18, 2016, the contents of both of which are incorporated by reference herein in their entirety.

TECHNICAL FIELD

The present disclosure relates to a vehicle analysis method and system and particularly, but not exclusively, to a method (and system) for analysing vehicle behaviour around a critical event. Aspects of the invention relate to a method of analysing a vehicle trajectory, to an associated system for analysing vehicle behaviour, and to a vehicle.

BACKGROUND

Following a critical event such as a vehicle crash it is often desirable to recreate the behaviour of the vehicle or vehicles involved in the critical event. Such recreations may be used to determine the cause of an accident, whether there were any vehicle component failures, whether any vehicle components were taken beyond their safe operating envelope and potentially for determining responsibility for the critical event.

Current vehicle crash investigations use physical methods to recreate the critical event. Data charts relating to on-board telemetry data may also be used in prior art analysis methods which may not fully represent the vehicle behaviour around the critical event. Vehicle trajectory reconstruction may also rely on assumptions relating to the vehicle's behaviour that are taken from witness reports, which can be unreliable or incomplete, and from physical analysis from the scene.

Known vehicle trajectory reconstruction software systems often rely on reconstructing the crash scene via witness statements, photographs and skid mark measurement. Such reconstruction packages may therefore not accurately recreate vehicle trajectory due to the reliance on subjective input data.

SUMMARY OF THE INVENTION

According to an aspect of the present invention there is provided a method of reconstructing vehicle behaviour for a vehicle that has been subject to a critical event, the method comprising: receiving vehicle sensor data associated with vehicle motion; receiving a critical event notification signal, the critical event notification signal being associated with a critical event time for the critical event; deriving, from the received vehicle sensor data, a vehicle trajectory within a time window prior and adjacent to the critical event time; outputting the vehicle trajectory.

The present invention provides a method of reconstructing the trajectory of a vehicle that has been involved in a critical event. Once a critical event notification signal is received, vehicle sensor data taken from the vehicle is used to derive the vehicle trajectory in the period leading up to a critical event time associated with the critical event. In this manner the behaviour of a vehicle that has been involved in a crash or some other event during driven, occupied use of the vehicle may be analysed and the derived trajectory output for further analysis and processing.

According to an aspect of the present invention there is provided a computer implemented method of reconstructing vehicle behaviour for a vehicle that has been subject to a critical event, the method comprising: receiving vehicle sensor data associated with vehicle motion; receiving a critical event notification signal, the critical event notification signal being associated with a critical event time for the critical event; deriving, from the received vehicle sensor data, a vehicle trajectory within a time window prior and adjacent to the critical event time; analysing the vehicle trajectory to determine forces acting through the vehicle system; outputting a notification signal in the event that one or more of the determined forces exceeds one of more of the operating parameters of the vehicle.

The present invention provides a computer implemented method of reconstructing the trajectory of a vehicle that has been involved in a critical event. Once a critical event notification signal is received, vehicle sensor data taken from the vehicle is used to derive the vehicle trajectory in the period leading up to a critical event time associated with the critical event. In this manner the behaviour of a vehicle that has been involved in a crash or some other event during driven, occupied use of the vehicle may be analysed and the derived trajectory may be analysed to determine forces acting through the vehicle system. In the event that one of more of the determined forces exceed one of more of the operating parameters of the vehicle then a notification signal may be output. For example, analysis of the trajectory may indicate that the vehicle has experienced an unusual acceleration or deceleration event that indicates collision with a vehicle or other road objects. Analysis of the trajectory may also indicate transfer forces operating on the vehicle during a collision. Further, analysis of the trajectory may comprise inputting the derived trajectory into a multi-body model in order to determine forces acting on components within the vehicle.

The vehicle trajectory can be automatically analysed to determine forces acting through the vehicle system; and the notification signal may then be output, in dependence on said automatic analysing.

The vehicle sensor data may comprise vehicle acceleration data in three axes, and wherein deriving the vehicle trajectory comprises integrating acceleration data to determine vehicle positional data in three dimensions. In an embodiment deriving said vehicle trajectory may comprise deriving said vehicle trajectory by: defining a starting point in time and space coincident with receipt of the critical event notification signal and determining, at predetermined time intervals at least prior to the critical time, the vehicle position in three dimensions relative to said starting point.

Optionally, the critical event notification signal may comprise a notification signal from a vehicle sensor that has exceeded a predefined parameter. For example an accelerometer may be associated with a safe acceleration/deceleration parameter and in the event that this predetermined parameter is exceeded a notification signal may be generated.

Optionally, the critical event notification signal may comprise an airbag deployment signal received from an airbag system. The airbag system (which may comprise a series of airbags and side airbags) is configured to deploy in the event of a critical event and the deployment of some or all of the airbag system components may provide the critical event notification signal. It is also noted that the generation of a notification signal by such a system may not always be associated with a corresponding deployment of the safety system components (e.g. in the event of a failure of said system the components may fail to deploy even though the system logic has determined that the system should be activated).

Optionally, the vehicle trajectory may also be determined for time periods after the critical event time and further may be determined for all time periods for which there is available sensor data. Deriving said vehicle trajectory after the critical event time may comprise: from a defined a starting point in time and space coincident with receipt of the critical event notification signal, determining, at predetermined time intervals after the critical event time, the vehicle position in three dimensions relative to said starting point.

The vehicle sensor data may comprise wheel speed data and steering wheel position data. The provision of these two pieces of data is sufficient to determine vehicle trajectory. Optionally, however, the vehicle sensor data may comprise vehicle acceleration data in three axes. Optionally, such vehicle sensor data may be integrated (twice) to determine the vehicle position in three dimensions.

Vehicle sensor data may comprise wheel speed data. Optionally, the wheel speed data may be used to derive vehicle velocity and compared to vehicle velocity calculated from the received acceleration data. In the event of any discrepancy in the integrated velocity values the vehicle velocity determined from integrating the received acceleration data may be adjusted so that it is consistent with the vehicle velocity derived from wheel speed data.

In addition to acceleration data in three axes, the vehicle sensor data may comprise roll rate, pitch rate and yaw rate data and deriving vehicle trajectory may comprise integrating received sensor data to determine roll angle, pitch angle and yaw angle of the vehicle In order to compensate for road camber and hill effects, the method optionally comprises receiving road geometry data and deriving the vehicle trajectory data comprises compensating the derived trajectory for motion effects resulting from the road geometry.

Road environment data (e.g. data retrieved from the scene of a critical event or from on-vehicle sensors that may monitor the environment) may be received and an animation of the vehicle may be derived in dependence on the derived trajectory and road environment data.

Optionally, the method comprises receiving data relating to other road users and analysing the vehicle trajectory comprises calculating transfer forces between the vehicle and other road users.

Once a vehicle trajectory has been derived the analysis of the vehicle trajectory step within the method optionally comprises inputting data relating to the derived vehicle trajectory into a multi-body model for the vehicle, the multi-body model comprising configurable parameters for adjusting the model.

The determined vehicle trajectory may be compared with a vehicle trajectory output from the multi-body model and the configurable parameters of the multi-body model may be adjusted until the multi-body model trajectory substantially aligns with the determined vehicle trajectory.

Forces operating on a vehicle component leading up to the critical event may be determined using the multi-body model. The forces that are determined may include load forces, stress related forces, buckling and other nonlinear behaviour. Determining the detailed component and system level forces may be used to analyse a failure chain and the order of component failures.

A notification signal or alert may be output in the event that the determined forces exceed the design parameters of the vehicle component.

Optionally, the multi-body model comprises modelling a vehicle occupant during the critical event. Modelling the occupant during the critical event may comprise determining acceleration levels acting on the occupant in order to determine an abbreviated injury scale (AIS) code or a head injury criteria (HIC) rating.

The outputs from the multi-body model may be output to a simulator model.

Road environment data may be received from a vehicle sensor, such as a camera or a GPS unit.

Optionally, an animation of the vehicle may be generated in dependence on the derived trajectory and road environment data.

A method as claimed in any preceding claim, wherein received vehicle sensor data comprises one or more selected from the group: accelerometer data, gyroscopic data, vehicle speed data, throttle position data, brake pedal input, steering wheel input, vehicle ride height data, damper setting data, environmental sensor data.

Received vehicle sensor data may also comprise data from vehicle camera systems and/or data from occupants' smartdevices.

According to an aspect of the present invention there is provided a system for recreating vehicle behaviour that has been subject to a critical event, the system comprising: an input arranged to receive an electrical signal indicative of vehicle sensor data associated with vehicle motion and to receive an electrical critical event notification signal, the critical event notification signal being associated with a critical event time for the critical event; a processing means arranged to derive, from the received vehicle sensor data, a vehicle trajectory within a time window prior and adjacent to the critical event time and to analyse the vehicle trajectory to determine forces acting through the vehicle system; and an output arranged to output a notification signal in the event that one or more of the determined forces exceeds one or more of the operating parameters of the vehicle.

The vehicle sensor data may comprise electrical signals indicative of vehicle acceleration data in three axes, and deriving the vehicle trajectory may comprise integrating acceleration data to determine vehicle positional data in three dimensions. Deriving the vehicle trajectory may comprise the processing means deriving said vehicle trajectory by: defining a starting point in time and space coincident with receipt of the critical event notification signal and, at predetermined time intervals at least prior to the critical time, determining the vehicle position in three dimensions relative to said starting point.

In an embodiment the processing means may comprise an electronic processor having an electrical input for receiving the an electrical signal indicative of vehicle sensor data and the electrical critical event notification signal; and an electronic memory device electrically coupled to the electronic processor and having instructions stored therein, and the processor may be configured to access the memory device and execute the instructions stored therein such that it is operable to: derive, from the received vehicle sensor data, a vehicle trajectory within a time window prior and adjacent to the critical event time.

According to an aspect of the present invention there is provided a data storage device for recording vehicle data to allow recreation of vehicle behaviour, the data storage device comprising: an input arranged to receive vehicle sensor data associated with vehicle motion and to receive a critical event notification signal, the critical event notification signal being associated with a critical event time for the critical event; a processor arranged to store the received vehicle sensor data and critical event notification signal in a data store; an output arranged to output the stored vehicle sensor data and critical event notification signal to a further processor configured to derive a vehicle trajectory within a time window prior and adjacent to the critical event time wherein the processor is arranged to store vehicle sensor data as a moving data window within the data store.

The invention may therefore provide a "black box" for recording vehicle sensor data for later use in recreating the vehicle trajectory. The processor is arranged to store a moving window of data to a data store. The data window may comprise up to the last 10 seconds of vehicle data. Optionally, the processor is arranged to permanently store the vehicle data in the event that a critical event notification signal is received.

Optionally, the output may to output received vehicle sensor data and the received critical event notification signal to a remote server.

The invention extends to a vehicle comprising a data storage device according to the third aspect of the invention and to a non-transitory computer readable storage medium comprising computer readable instructions for a computer processor to carry out the method of the first aspect of the invention.

The various aspects of the invention may comprise the preferred features of any other aspect, unless incompatible therewith.

A computer-implemented method of reconstructing vehicle behaviour for a vehicle that has been subject to a critical event, the method comprising: receiving, at an input, vehicle sensor data associated with vehicle motion; receiving, at an input, a critical event notification signal, the critical event notification signal being associated with a critical event time for the critical event; storing the received data in an electronic memory device, the memory device being electrically coupled to a processor having instructions stored therein; accessing the memory device and executing the instructions stored therein to derive, from the stored vehicle sensor data, a vehicle trajectory within a time window prior and adjacent to the critical event time; outputting the vehicle trajectory from an output.

Additional aspects of the invention relate to: a non-transitory computer readable storage medium carrying computer readable code which when executed causes a computer processor to carry out the method of another aspect; a computer program product executable on a processor so as to implement the method of another aspect, and a processor arranged to implement the method of another aspect.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which:

FIG. 5 shows vehicle sensor data that may be used in accordance with embodiments of the present invention;

DETAILED DESCRIPTION

Embodiments of the present invention are described below in which vehicle sensor data is used to generate a rheonomic model of a vehicle before, during and after a critical event.

Figure 1:
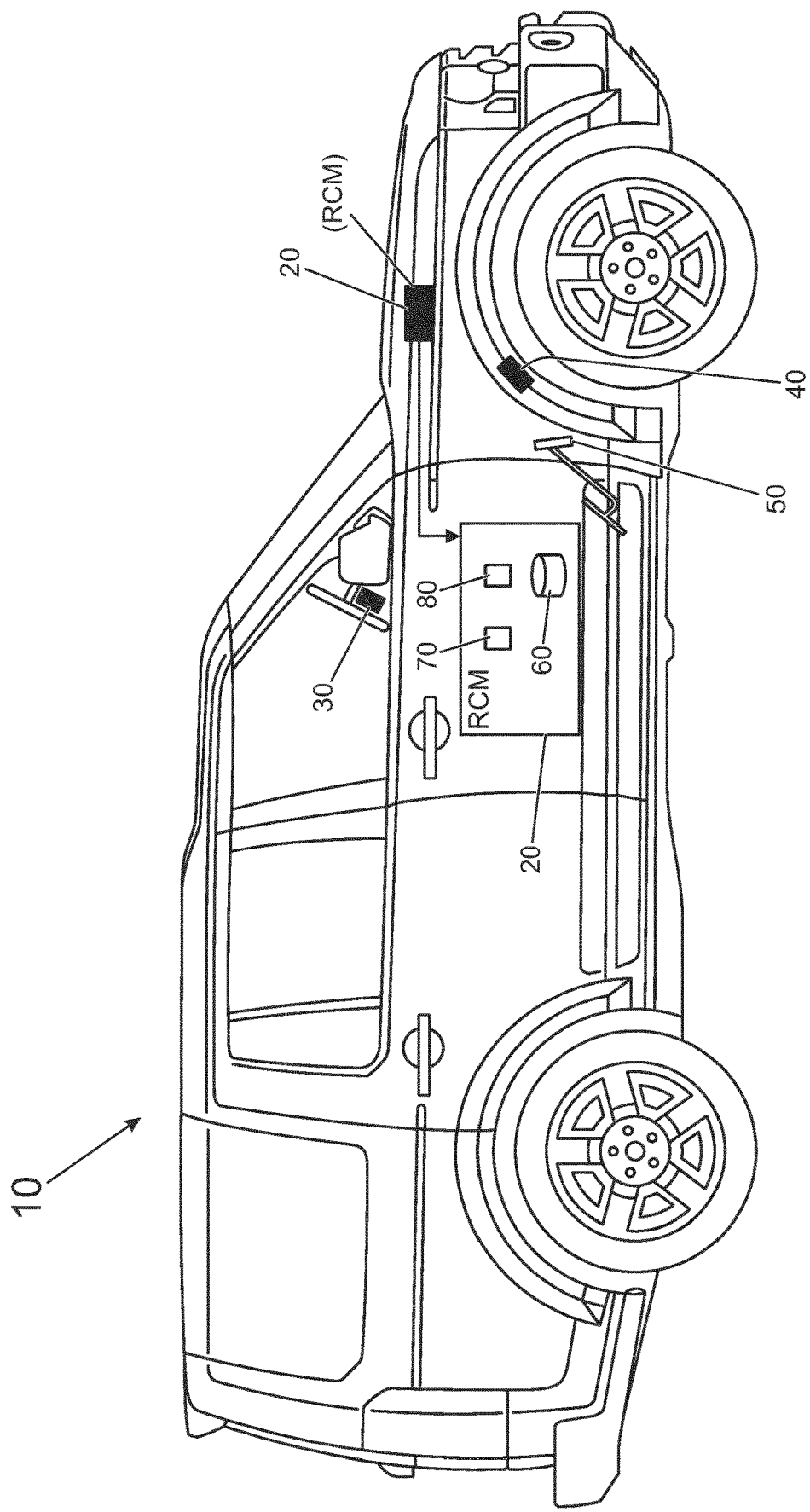
FIG. 1 shows a representation of a vehicle comprising a sensor data black box in accordance with embodiments of the present invention.

FIG. 1 shows a vehicle 10 comprising a sensor data "black box" in the form of an electronic control unit (ECU) 20 (referred to here as the restraints control module (RCM)) which is in communication with a number of sensor devices, including but not limited to a steering wheel sensor 30, wheel speed sensor 40, pedal position sensors 50. Each sensor is in communication via an on-board communication network (not shown) with the RCM 20. The RCM further comprises a data store 60 for storing data and may further include an inertial measurement unit or IMU, comprising a tri-axis accelerometer array 70 arranged to measure longitudinal, lateral and vertical vehicle acceleration and an array of gyroscopes 80, arranged to measure pitch, roll and yaw of the vehicle.

In the embodiment shown in FIG. 1, the RCM comprises an accelerometer 70 and a gyroscopic sensor 80. Such sensors may be used by the RCM 20 to determine when to deploy airbag units, pre-tensioner safety belts and/or any other deployable safety component within the vehicle in the event of a critical event (such as an accident).

It is noted that embodiments of the present invention relate to a vehicle that has been involved in a critical event. Although a critical event may include an event in which the vehicle restraint system (including airbags, other safety systems, ABS systems etc.) has been used, it is to be appreciated by the skilled person that a vehicle may be involved in a critical event without the vehicle restraint system being deployed at all (e.g. because of a system fault) or only partially deployed (because of the nature of the event the RCM may determine that only certain components of the restraint system should be deployed. For example, the RCM may deploy side impact airbags on the side of the vehicle cabin but not airbags from the front of the cabin). In certain circumstances the RCM may send an "All Fire" command to deploy all operational safety systems at the same time. It is noted that in normal operation the RCM is arranged to trigger a time zero (t=0) condition and then to calculate the best approach for firing none, all or specific airbags.

The RCM 20 of FIG. 1 is arranged to receive and store sensor data relating to gross vehicle motion from longitudinal, lateral, heave, pitch, roll and yaw acceleration (received from the accelerometer/gyroscopic sensors) and also sensor data relating to vehicle speed data, throttle position, brake pedal input, steering wheel input etc. from the other vehicle sensors on the vehicle.

It is noted that in FIG. 1 the RCM is arranged to comprise the accelerometer/gyroscope sensor (70/80) and to store sensor data. However, depending on a particular vehicle configuration, some or all of the vehicle sensor data may be stored elsewhere on the vehicle, e.g. the main ECU or a dedicated storage unit. Although embodiments of the invention are described with reference to a single RCM it should be appreciated by the skilled person that a plurality of control modules on a vehicle may be used to provide the functionality of the RCM described herein. It is also noted that in other embodiments of the invention a single vehicle control computer could be used to perform all of the functions of the vehicle with in-car and cloud recording of data.

In use the RCM 20 is arranged to store the last few seconds of data output from the various sensors on the vehicle. Typically, the RCM may be configured to store data from the last five seconds. Such stored data is constantly overwritten such that the RCM acts as a data buffer for the last few seconds of sensor data.

It is noted that depending on the vehicle configuration, the capabilities of the RCM and/or the available on-vehicle data storage, the data buffer may store more or less than the last five seconds of data.

Figure 2:
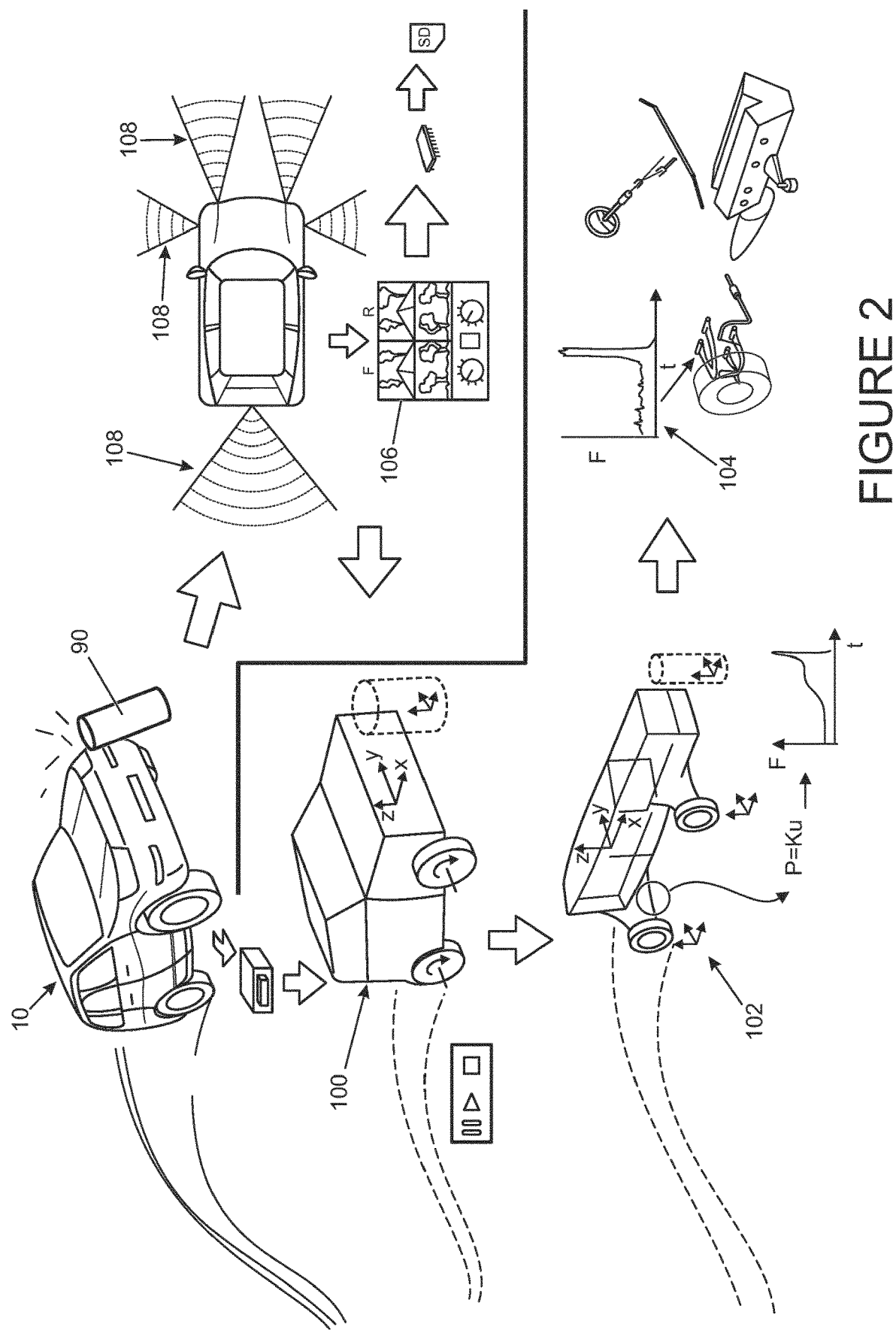
FIG. 2 provides an overview of a method of analysing vehicle behaviour in accordance with embodiments of the present invention.
Figure 3:
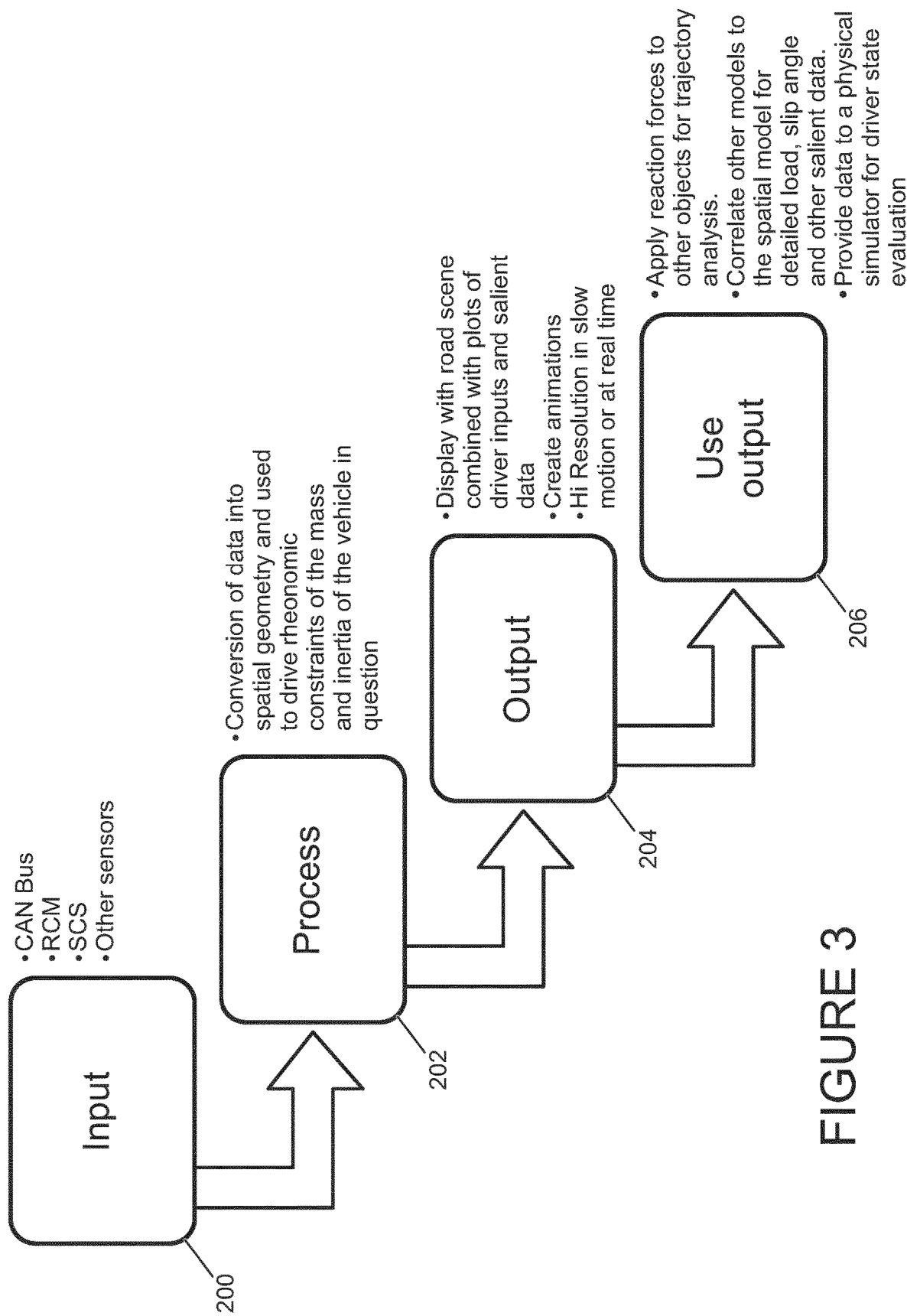
FIG. 3 is a flow chart of a method of analysing vehicle behaviour in accordance with embodiments of the present invention.

FIGS. 2 and 3 provide an overview of a method of analysing vehicle behaviour in accordance with an embodiment of the present invention.

In FIG. 2 a vehicle involved in a critical event is shown. In the embodiment shown in FIG. 2 the vehicle 10 has collided with a post 90. Following such a critical event the vehicle black box unit 20 may either be extracted or accessed and the data contained therein used to generate an animated version 100 of the vehicle's trajectory (a rheonomic model) leading up to the critical event. Depending on the vehicle sensors on the vehicle 10, sensor data may be collected through the point of the critical event and for some time afterwards.

The sensor data may also be used to configure a multi-body simulation model 102 of the critical event which can then be used to analyse forces and stresses 104 on the vehicle components. Buckling of suspension components and other non-linear behaviour of the vehicle may also be predicted from the MBS model once it has been configured. It is noted that "fuses" may be engineered into a vehicle system to fail in a safe buckling manner rather than a shear or dismemberment of the suspension. With multiple component failures after a critical event the modelling of the components according to embodiments of the present invention may prove key to determining that a fuse component failed first rather than another component.

As part of the process (described in more detail below) of generating an animated version 100 of the vehicle's trajectory, road environment data 106 may be captured in order to enhance the animation. Such road environment data may include imaging data from Google® Earth and Google® Streetview (or equivalent imaging and mapping data). Other environmental data is also useful.

In a further feature the road environment data may as an alternative (or in addition) be provided from data captured by on-board systems on the vehicle. For example, in the event the vehicle comprises forward and rear camera units for parking manoeuvres and side camera units for driving manoeuvres, such camera units 108 may supply data to the data store associated with the RCM. Such camera unit data may then be used to recreate the road environment following a critical event.

FIG. 3 shows an overview of processing steps in accordance with an embodiment of the present invention.

In step (200) vehicle sensor data is stored within the data store 60 associated with the RCM 20. Such sensor data may be supplied from components directly associated with the RCM itself (gyroscopic 80 and acceleration 70 data), vehicle sensor data (e.g. wheel speed, steering wheel and pedal positions) and from other on-board systems such as the stability control system (SCS) (not shown). The SCS may provide data relating to the vehicle's response leading up to a critical event (e.g. brake data for the vehicle as the driver attempts to recover any "out of control" vehicle motion, wheel slip events and wheel lock events). The SCS may also provide details of the system logic applied by various vehicle systems.

Road environment data may also be stored within the RCM 20 from the camera units 108 on the vehicle.

In Step (202) the received sensor data is processed within a processing means, which may be in the form of one of more processors to derive spatial geometry data relating to the vehicle (e.g. position, roll, pitch and heave information) and used to create a rheonomic model 100 of the vehicle. Road environment data 106 received either from on-board vehicle systems 108 or from external sources is used to create and generate an animation of the vehicle's trajectory. It will be understood that, as used herein, the term "processor" includes one or more processors.

In step (204) the animation is output (e.g. to a display device)

In step (206) the data generated in step (202) may be passed to further modelling systems such as a multi-body system model 102 in order to determine forces and stresses 104 acting on the vehicle 10 leading up to, through and after a critical event. Such modelling may be used to determine if any vehicle components have exceeded their design parameters either before the critical event took place (possibly therefore indicating a cause of a crash) or during the critical event itself. Alternatively, based on other data analysed from the vehicle, it may be determined that human error was, at least in part, the cause of the event.

Figure 4:
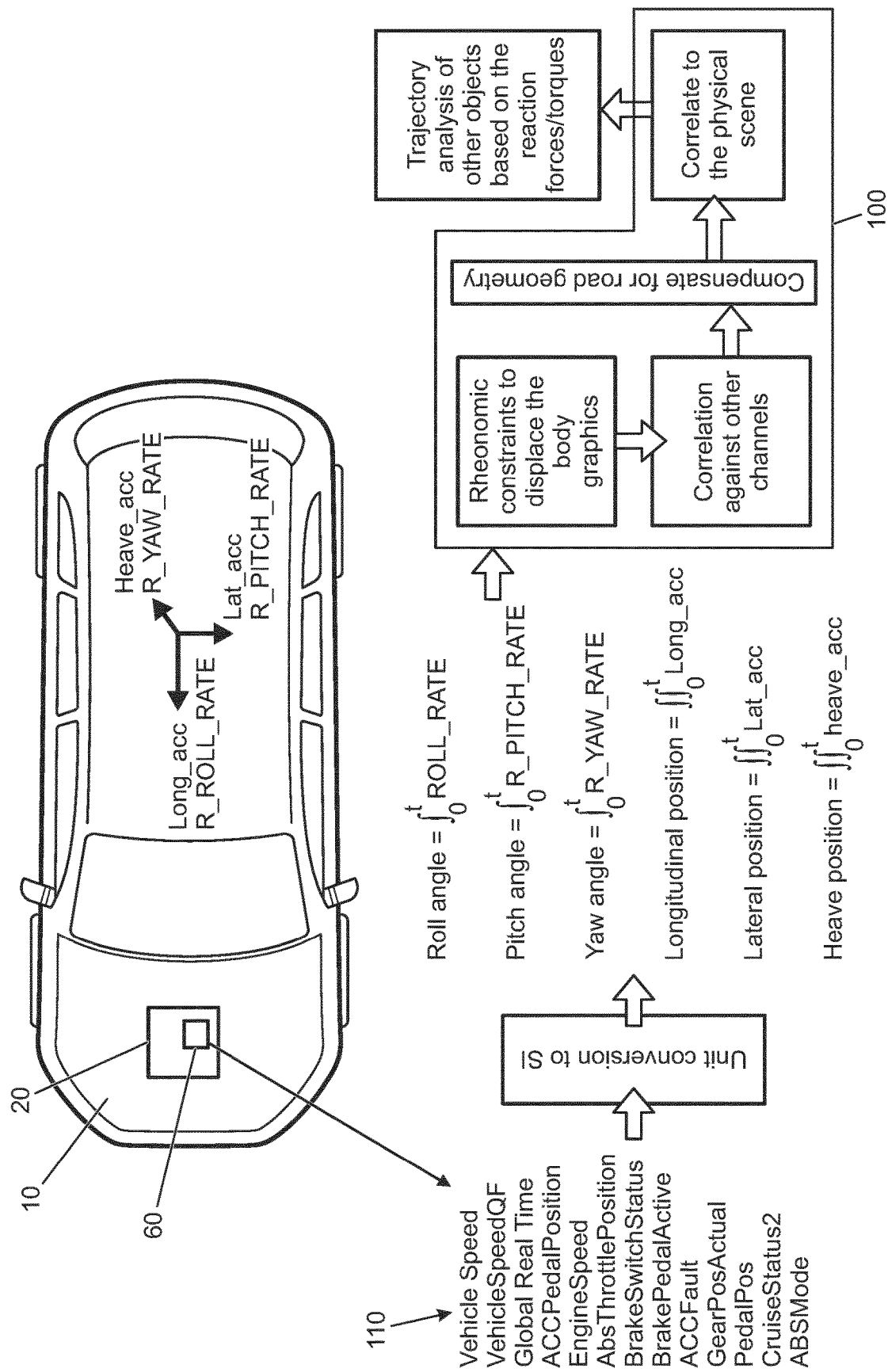
FIG. 4 shows the process of deriving the trajectory of a vehicle that has been involved in a critical event in accordance with embodiments of the present invention.

FIGS. 4 and 5 show the process of generating the rheonomic model 100 of the vehicle's trajectory in more detail.

As shown in FIG. 4, vehicle sensor data 110 is stored within the RCM data store 60 during operation of the vehicle 10. As noted above the data stored may comprise a moving window of data, e.g. the last 5 seconds of data, until a critical event is detected at which point the currently stored data is not permanently saved and the RCM stores as much subsequent data as possible (e.g. until sensors stop sending data because of damage incurred during the critical event, or until electrical power is lost or the ignition system cycled or switched off).

The trigger for the critical event may comprise a deployment signal for a deployable safety component such as an airbag, pre-tensioner safety belt, pop-up rollover bar, active bonnet, or other similar device. It will be appreciated by one skilled in the art that it is typical, in the event of a vehicle rollover, for active devices such as occupant restraints to be deployed on the basis of a prediction of a likely critical event occurring rather than as a result of a detected critical event.

Examples of vehicle sensor data that is received and stored on board the vehicle includes some or all of the following: acceleration data, pitch/roll/yaw rate data, vehicle wheel speed data, time data, accelerator pedal input, brake pedal input, engine speed, brake switch status data.

Examples of received sensor data are shown in FIG. 5 in which the stored data comprises low fidelity data 112 (two samples per second) and high fidelity data 114 (10 samples per second). High fidelity data may comprise the acceleration data and the pitch/roll/yaw rate data which may be received from dedicated sensors (70, 80) via a central system bus within the vehicle. The low fidelity data 112 may de received from other on-board sensors via the central system bus.

The received sensor data is converted into SI units and the low fidelity vehicle wheel speed data is used to determine initial vehicle velocity. The longitudinal, lateral and heave acceleration data is then integrated, using the initial vehicle velocity data, to determine the vehicle position and attitude over time.

The vehicle position data and attitude are then used to create a model 100 of the vehicle trajectory. Vehicle position data may either be provided via an on board GPS unit on the vehicle or determined after the critical event from scene data (e.g. impact geometry for the vehicle may be determined from police incident reports).

In order to ensure the position and attitude information that is derived from integrating the measured acceleration and gyroscopic data is as accurate as possible, the vehicle velocity as determined from integration of the raw sensor data may be correlated against another channel of sensor data, namely the vehicle speed derived from wheel sensors.

The critical event trigger signal defines time zero (t=0) for the above calculations. The vehicle trajectory is therefore calculated for t<0 s from the stored data in the RCM data store and, if available sensor data is present, the vehicle trajectory is extended into t=0 s and t>0 s.

It is noted that vehicles may additionally be configured to provide more details acceleration and/or velocity data at specific areas of interest on a vehicle. Such data may be stored in the data store alongside the data described above and used in the animation of the vehicle trajectory.

Such additional data may be provided by a variety of sensors and systems on a vehicle. Vehicle height sensors may be used to determine details of the texture of the road/ground surface. Such sensors may also be used to confirm that the wheel hop resonance is as expected. This allows confirmation that the suspension dampers were operating within normal parameters prior to the critical event. Vehicle height sensors may comprise a levered potentiometer located on the lower arm of the suspension to the body.

A continuously variable damping (CVD) controller may be provided on the vehicle to provide active damping. Active suspension current data taken from the CVD controller enables a determination as to whether the dampers are set to a "soft", "firm" or other setting.

It is also noted that linear variable differential transformers (LDVT) may be provided on the damper components of a vehicle to provide accurate height data.

Air suspension pressure sensors located within the airline system and valve block may be used to provide additional information about the dynamic state of the suspension.

Environmental sensors may also be used to provide further data. Such sensors may comprise temperature sensor, windscreen rain sensor, windscreen light level sensor. The friction related properties of the road surface (mu) may also be estimated from data obtained from the SCS system.

If the road that a vehicle is using has a camber then the sensor data from the accelerometer and gyroscope would, once integrated, suggest that the car was cornering when it wasn't or cornering at a rate that does not match the actual road geometry.

Additionally, if the road comprises changes in elevation as a result of changing road gradients the vehicle may look like it is pitching or rolling when in fact it is just following the road profile.

As a result the trajectory of the vehicle determined from the black box data may be adjusted to account for road geometry. It is noted that vehicles fitted with a means to adjust the ride height such as may be provided by air suspension may sufficiently adjust the ride position of the vehicle that such a compensation step is unnecessary.

Following compensation for road geometry the trajectory of the vehicle as derived from the received sensor data is correlated to the physical scene where the critical event took place. The physical scene may be recreated using imagery from a number of sources such as photography of the scene of the critical event, topographical laser scanning data from the site and/or data from online services such as Google Earth® and Google StreetView®.

Following correlation of the vehicle trajectory to the physical scene an animation of the vehicle behaviour can be created. Further additions to the animation such as other road users, road furniture and other objects are added to complete the animation.

Analysis of the vehicle trajectory can then take place. For impacts between the vehicle and other road users or objects, the rheonomic model 100 may be interrogated to determine impact velocities such that transfer forces (Force=mass of vehicle×velocity$^2$) can be calculated. It is noted that joint force resulting from a collision may be determined via the RCM analysis according to embodiments of the present invention to determine forces and torques acting through the centre of gravity of the vehicle. Once a multibody model 102 has been configured according to embodiments of the present invention then detailed forces acting on the vehicle around the critical event may be analysed and unusual decelerations may be identified. Generally speaking a vehicle will only slow down as a result of one or more of braking effects, rolling resistance or aerodynamic resistance. Any deceleration effects that are observed over and above the deceleration due to these factors will be due to a third party (e.g. collision with an object or another vehicle).

Once transfer forces have been determined the effect of a critical event on another road user can be modelled.

Figure 6:
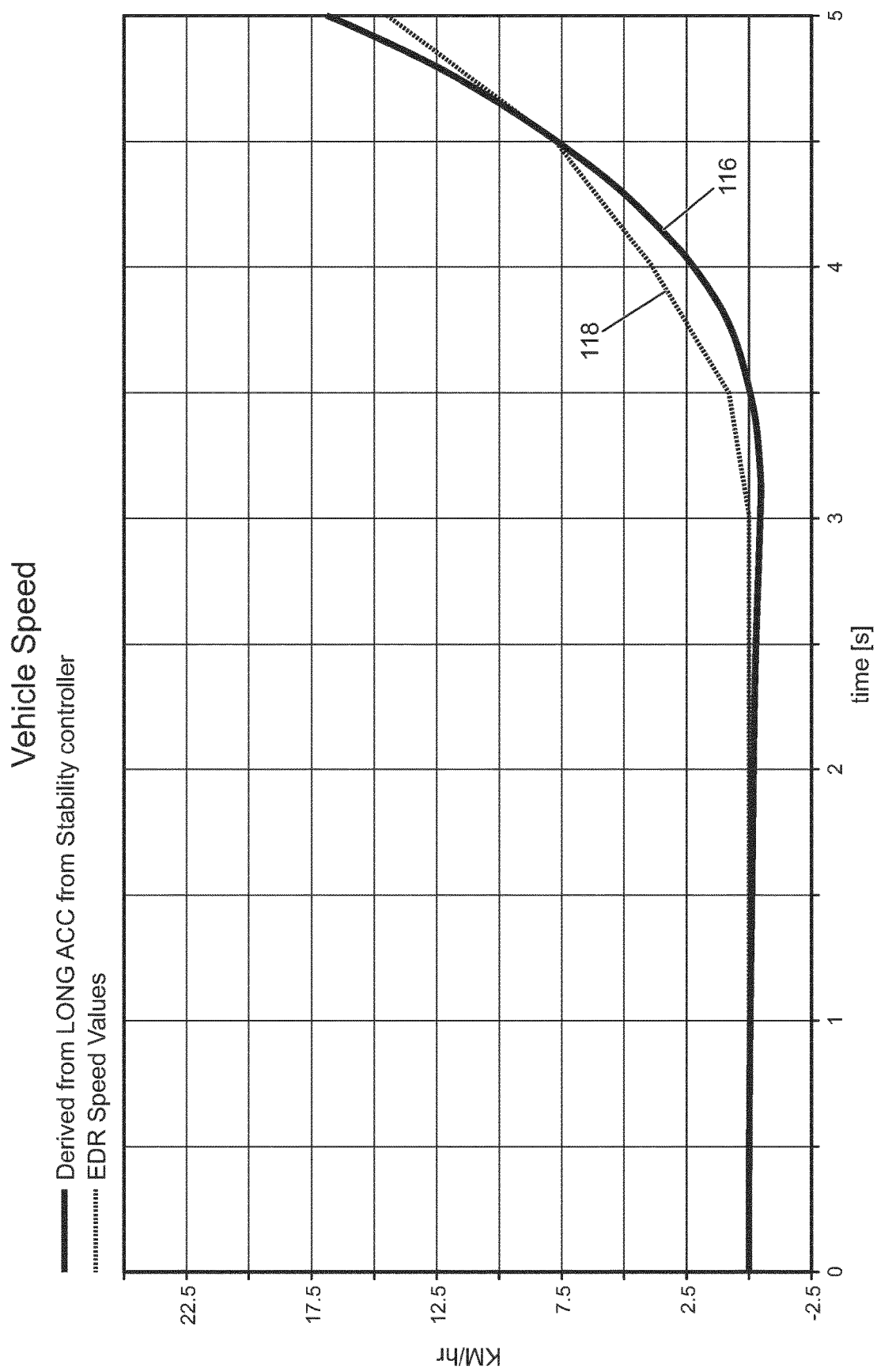
FIG. 6 shows a comparison of vehicle speed data derived from on-board vehicle sensors in accordance with embodiments of the present invention.

FIG. 6 shows a comparison of vehicle velocity data 116 derived from accelerometer 70 data versus data 118 derived from a wheel speed sensor 40. It can be seen that there is a close correlation between the two sets of data.

Figure 7:
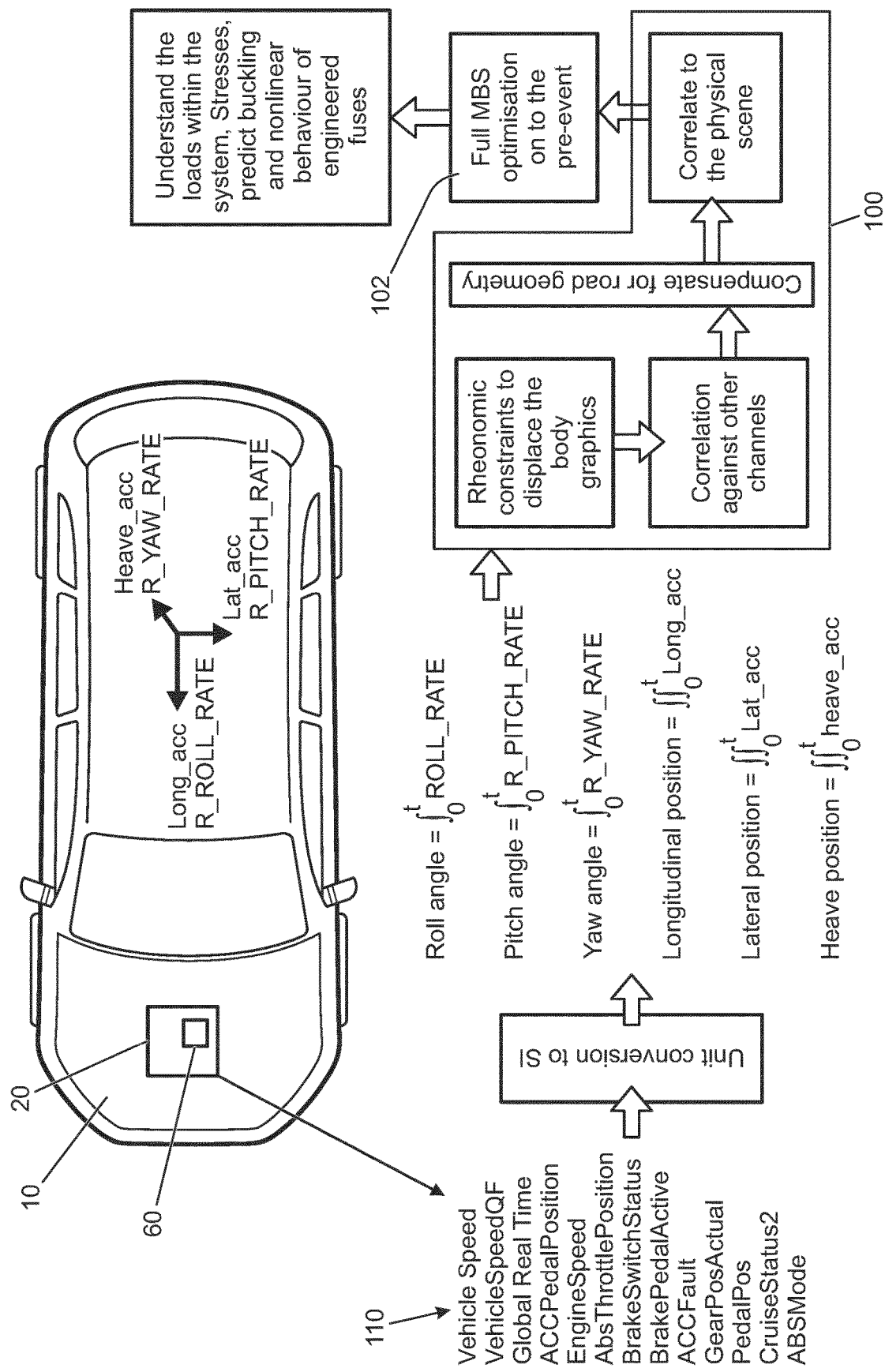
FIG. 7 shows the process of using a multi-body system model to analyse the effect of a critical event on vehicle components in accordance with an embodiment of the present invention.

FIG. 7 shows the process of using a multi-body system (MBS) model 102 to analyse the effect of a critical event on vehicle components in accordance with an embodiment of the present invention.

Like numerals between FIGS. 4 and 7 denote like features. It can be seen that once the derived vehicle trajectory 100 has been correlated to the physical scene, an MBS model 102 for the vehicle under analysis can be optimised based on the determined trajectory and the physical scene data.

Optimisation of the MBS model comprises adjusting the parameters of the MBS model until the behaviour predicted by the MBS model matches that observed by analysing the black box data from the vehicle. This may be an iterative process. The MBS model may be optimised by modifying the road surface to tyre interaction (mu) and by modifying the dampers knowing the ambient temperature and road roughness. The loading condition of the vehicle (corner weights, inertia and payload) may also be specified within the model.

Once the MBS model has been optimised it may be analysed to determine loads 104 within the vehicle system. Individual components may be analysed to determine stresses during the critical event (and during the time period just before and after the event) and to predict vehicle deformation and other potentially non-linear behaviour. In this manner it is possible to determine if the vehicle component has failed or if it was subjected to loadings outside of its operational design envelope.

Figure 8:
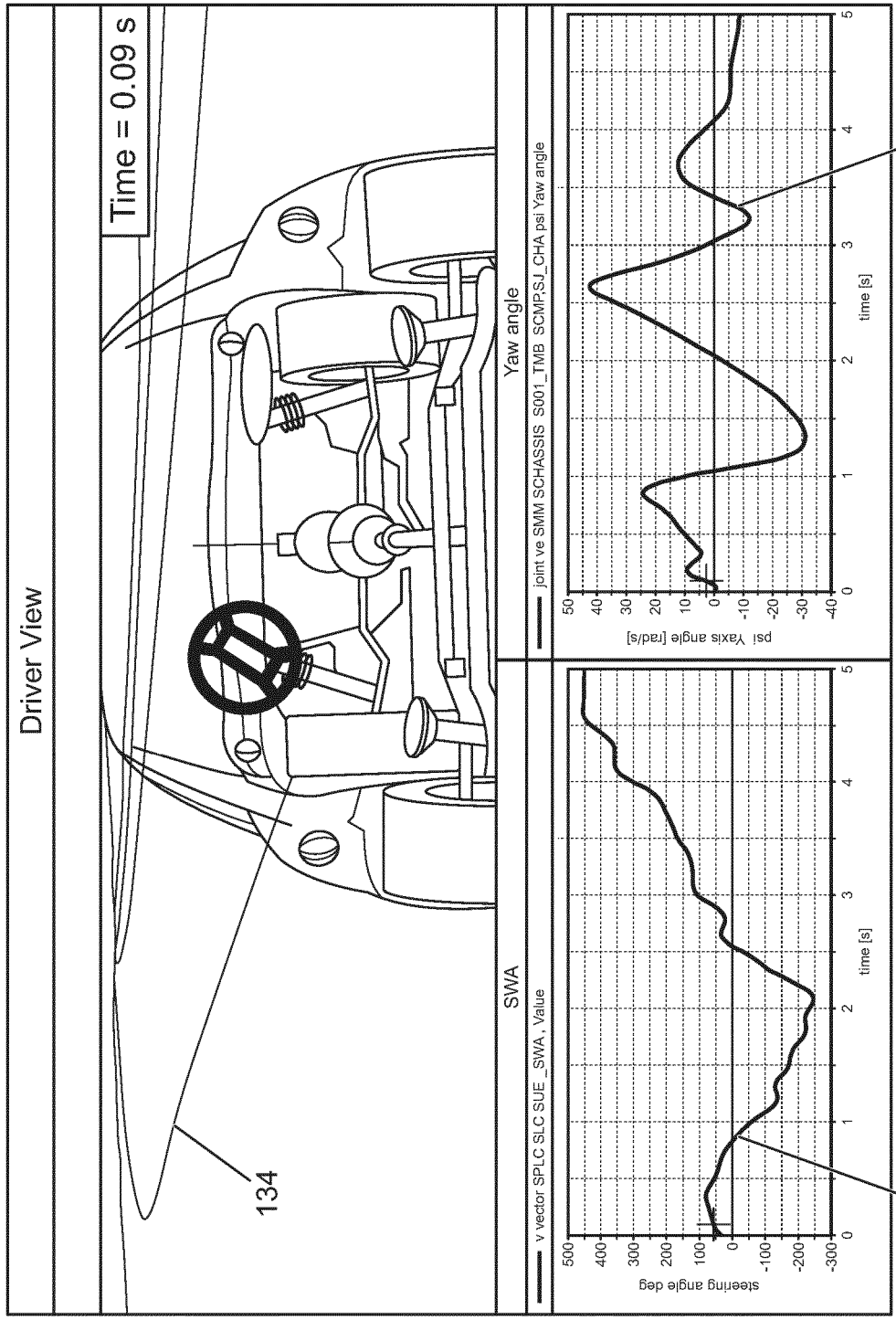
FIG. 8 shows a screenshot from a multi-body system model.

FIG. 8 shows the output of an MBS model 102 that may be used in accordance with embodiments of the present invention and shows a SIMPACK model that has been correlated to the black box model 100. FIG. 8 shows a steering and speed event. Steering wheel angle 130 and vehicle speed may be applied to the MBS model and yaw data 132 may be shown as the response. In FIG. 8 a road path 134 is shown as a long curve to the right. There is a left turn on the steering wheel and subsequent yaw angle of the front wheel which shows the driver attempting to recover control of the vehicle.

Figure 9:
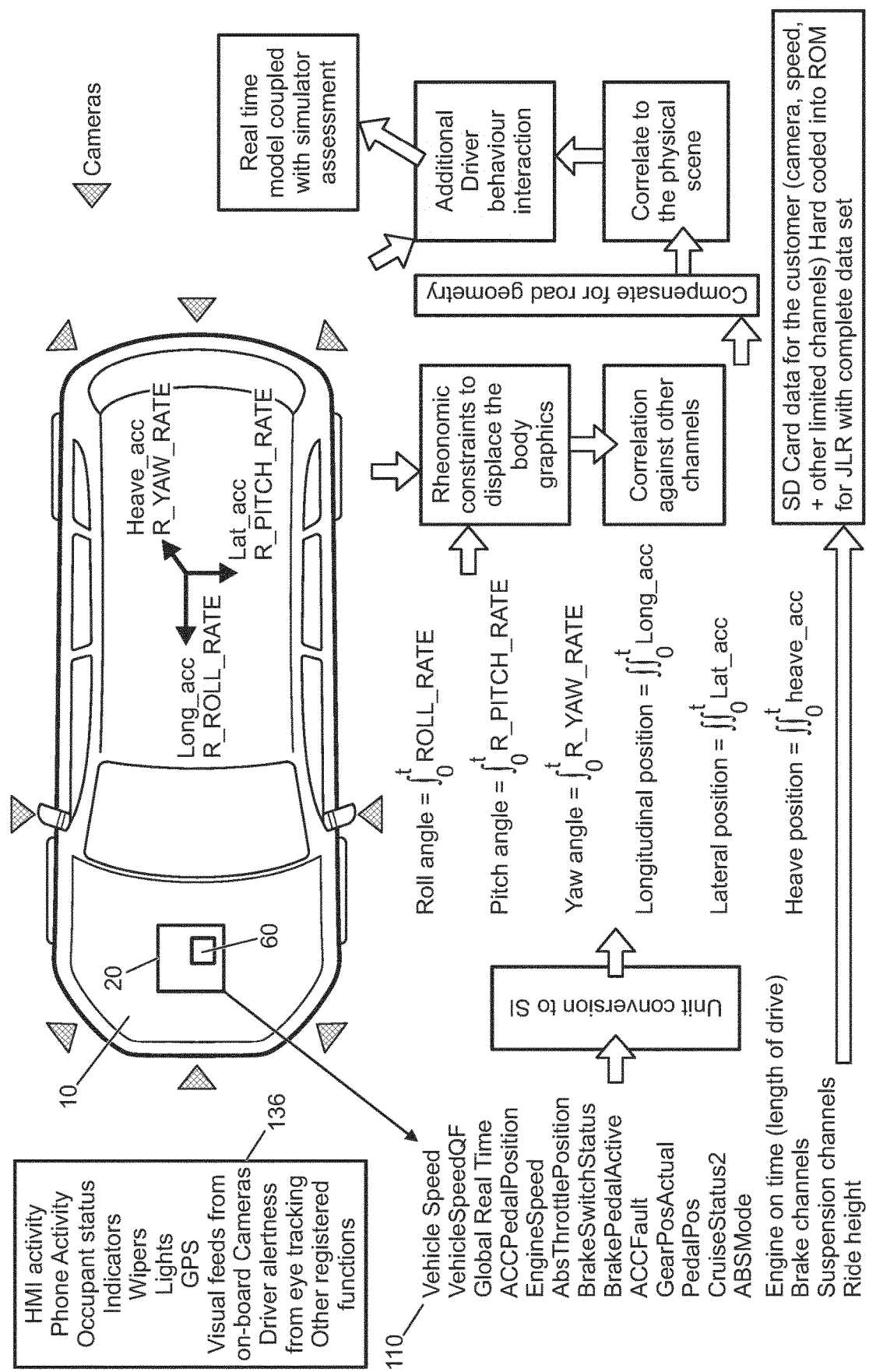
FIG. 9 shows a process similar to FIG. 4 in which further sensor data is collected.

FIG. 9 shows an embodiment of the present invention in which further sensor data 136 is collected.

Like numerals between FIGS. 4 and 9 denote like features. It can be seen that once the derived vehicle trajectory has been correlated to the physical scene, additional driver interaction data 136 is input into a real time model (such as the MBS model described above).

Additional driver interaction data may comprise some or all of: Human-machine interface data (e.g. HMI interaction data relating to the use of an infotainment system), mobile phone activity data, the status of the occupants, seatbelt status, indicators, windscreen wiper related data, light status, GPS data, visual feeds from on-board camera units, eye tracking data (to track the alertness levels of the driver of the vehicle), inputs made via driver controls, cabin sound recordings. Once a critical event has been correlated it would be possible to put a panel of expert and non-expert drivers through a simulator that is configured in the same manner as the correlated and optimised MBS model to determine how the actual driver behaved.

Feeds from on-board cameras may be used in addition to, or instead of, physical scene photographs and/or Google Earth/Streetview data to provide road environment data for use in creating an animation of the vehicle's trajectory.

Figure 10:
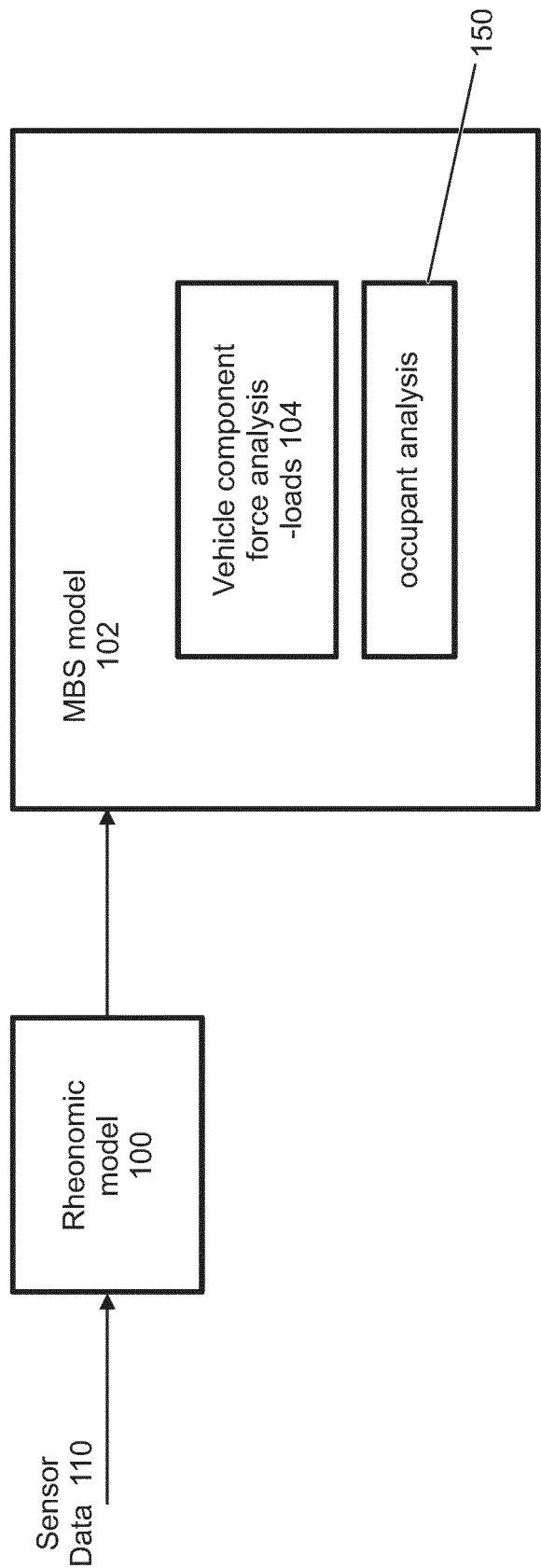
FIG. 10 shows the process of using the multi-body model to model a vehicle occupant during a critical event in accordance with an embodiment of the present invention.

It is noted that the multi-body simulation model 102 described above may be extended as shown in FIG. 10 to model 150 the interaction of any occupants in the vehicle in addition to the vehicle component modelling (to determine loads 104 on vehicle components) as described above.

In particular, the MBS model 102 may be extended to include a "crash test dummy" model of an occupant within the vehicle cabin. Alternatively a portion of the occupant, e.g. head, may be modelled.

Once the occupant has been modelled within the vehicle, the MBS model 102 may be run based on the received sensor data 110 and the rheonomic model 100 in order to determine an occupant trajectory within the vehicle during the critical event. Additionally, impact forces between the occupant and the vehicle interior may be determined and assessed against standards such as head injury criteria (HIC) to assess the forces operating on the occupant during and following the critical event.

Figure 11:
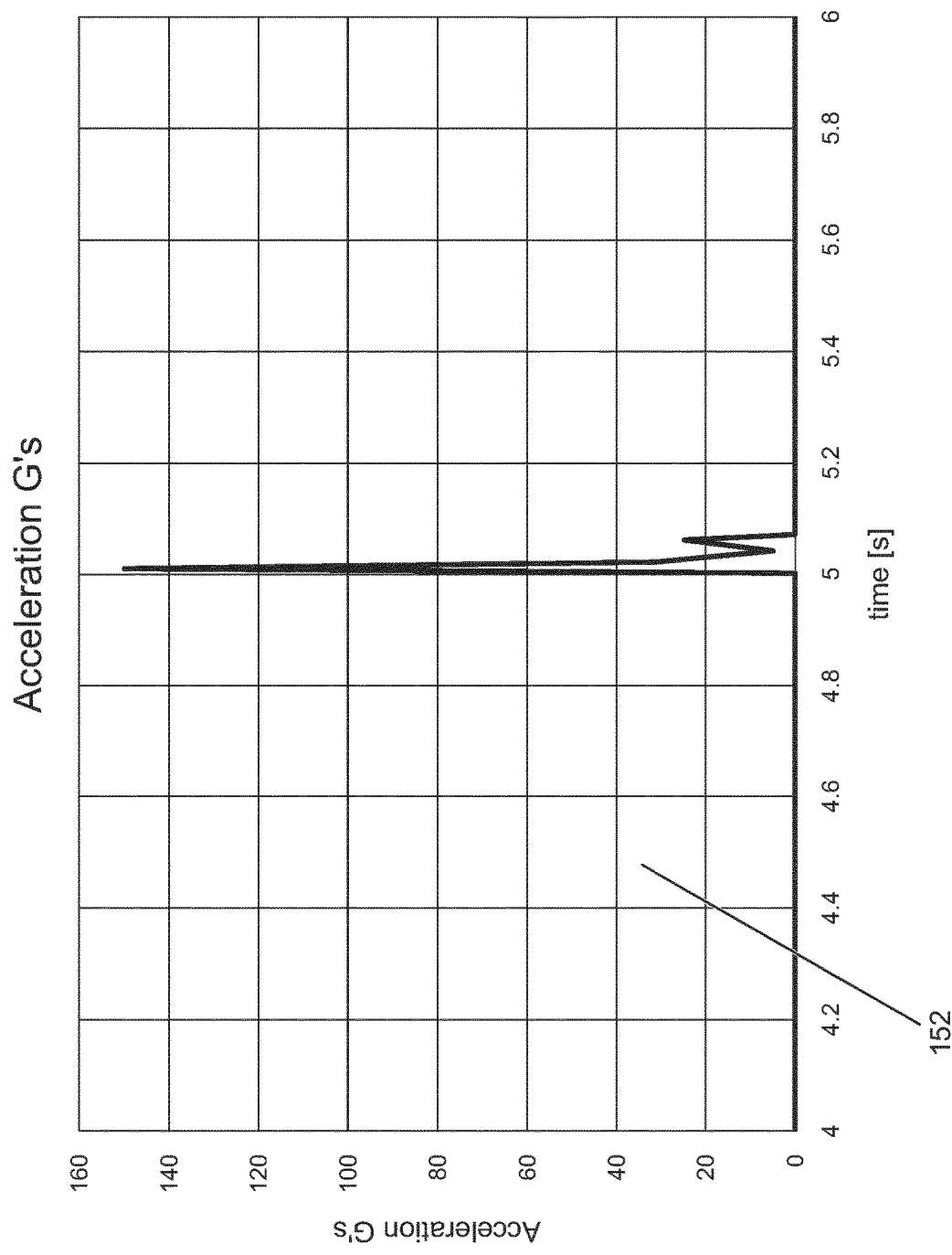
FIG. 11 shows a graph of acceleration over time for an occupant in a vehicle.

In this way the acceleration of the occupant may be determined during and following the critical event as shown in the acceleration vs time plot 152 in FIG. 11. The modelled acceleration values may be converted into a HIC-15 rating (a measure of the acceleration over an impact of 15 milliseconds) or an abbreviated injury scale code (such as AIS-90).

Many modifications may be made to the above examples without departing from the scope of the present invention as defined in the accompanying claims.

The invention claimed is:

1. A computer implemented method of reconstructing vehicle behaviour for a vehicle that has been subject to a critical event, the method comprising:
   receiving vehicle sensor data associated with vehicle motion;
   receiving a critical event notification signal, the critical event notification signal being associated with a critical event time for the critical event;
   deriving, from the received vehicle sensor data, a vehicle trajectory within a time window prior and adjacent to the critical event time;
   inputting data relating to the derived vehicle trajectory into a multi-body model for the vehicle to determine forces acting on components within the vehicle during the time window prior and adjacent to the critical event time; and
   outputting an indication of the determined forces acting through the vehicle system.

2. A method as claimed in claim 1, wherein said vehicle sensor data comprises vehicle acceleration data in three axes, and wherein deriving the vehicle trajectory comprises integrating acceleration data to determine vehicle positional data in three dimensions.

3. A method as claimed in claim 2 wherein deriving said vehicle trajectory comprises deriving said vehicle trajectory by: defining a starting point in time and space coincident with receipt of the critical event notification signal and determining, at predetermined time intervals at least prior to the critical time, the vehicle position in three dimensions relative to said starting point.

4. A method as claimed in claim 2, wherein the vehicle sensor data further comprises wheel speed data and wherein deriving the vehicle trajectory comprises comparing vehicle velocity determined from integrating the received acceleration data with vehicle velocity derived from wheel speed data.

5. A method as claimed in claim 4, comprising adjusting the vehicle velocity determined from integrating the received acceleration data so that it is consistent with the vehicle velocity derived from wheel speed data.

6. A method as claimed in claim 1, comprising deriving the vehicle trajectory after the critical event time.

7. A method as claimed in claim 1, wherein vehicle sensor data comprises wheel speed data and steering wheel position data.

8. A method as claimed in claim 1 wherein vehicle sensor data comprises roll rate, pitch rate and yaw rate data and deriving vehicle trajectory comprises integrating received sensor data to determine roll angle, pitch angle and yaw angle of the vehicle.

9. A method as claimed in claim 1, comprising receiving road geometry data and wherein deriving the vehicle trajectory data comprises compensating the derived trajectory for motion effects resulting from the road geometry.

10. A method as claimed in claim 1, comprising receiving data relating to other road users and calculating transfer forces between the vehicle and other road users.

11. A method as claimed in claim 1, wherein the multi-body model comprises configurable parameters for adjusting the model.

12. A method as claimed in claim 11, comprising comparing the determined vehicle trajectory with a vehicle trajectory output from the multi-body model and adjusting the configurable parameters of the multi-body model until the multi-body model trajectory substantially aligns with the determined vehicle trajectory.

13. A method as claimed in claim 11, wherein the multi-body model comprises modelling a vehicle occupant during the critical event.

14. A method as claimed in claim 1, comprising outputting a notification signal in the event that the determined forces exceed the design parameters of the vehicle component.

15. A system for recreating vehicle behaviour that has been subject to a critical event, the system comprising a processing means arranged to implement a method as claimed claim 1.

16. A system according to claim 15 wherein
the processing means comprises an electronic processor having an electrical input for receiving an electrical signal indicative of vehicle sensor data and the electrical critical event notification signal; and an electronic memory device electrically coupled to the electronic processor and having instructions stored therein,
wherein the processor is configured to access the memory device and execute the instructions stored therein such that it is operable to derive, from the received vehicle sensor data, the vehicle trajectory within the time window prior and adjacent to the critical event time, input the data relating to the derived vehicle trajectory into the multi-body model for the vehicle to determine the forces acting on the components within the vehicle during the time window prior and adjacent to the critical event time, and output the indication of the determined forces acting through the vehicle system.

17. A non-transitory computer readable storage medium carrying computer readable code which when executed causes a computer processor to carry out the method of claim 1.

18. A method as claimed in claim 1, comprising determining, using the multi-body model, component and vehicle system level forces.

19. A method as claimed in claim 18, comprising analysing component failure order using the determined component and vehicle system level forces.

20. A method as claimed in claim 1, comprising identifying the cause of a critical event by identifying vehicle components that have exceeded their design parameters either before the critical event took place.

* * * * *